May 27, 1969
L. J. MORGAN ET AL
3,446,939
ELECTRIC IMMERSION WATER HEATER
Filed Sept. 8, 1966
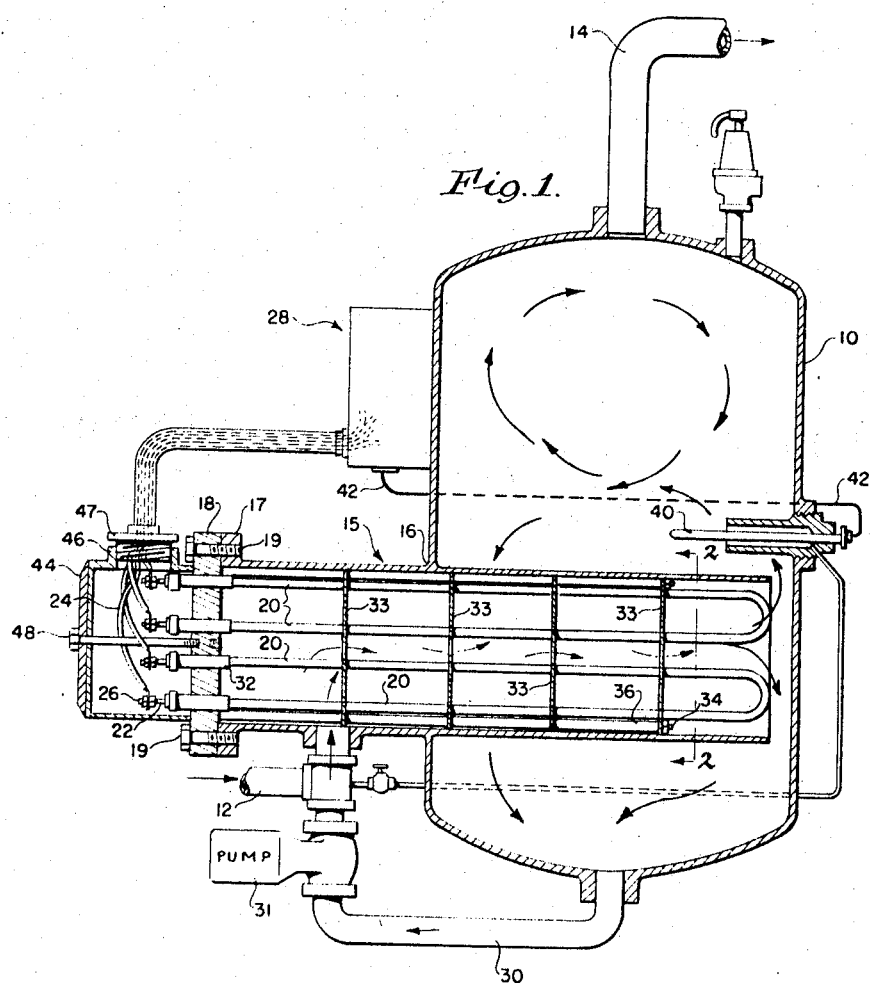
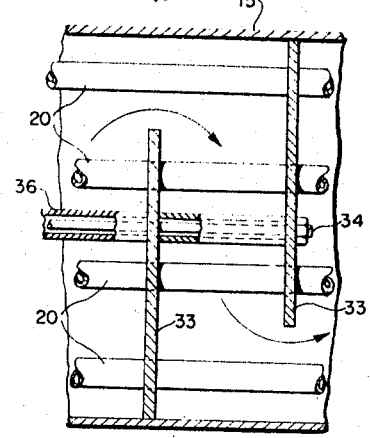
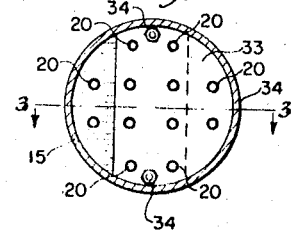
INVENTORS
LEMUEL J. MORGAN
LEONARD F. LOWE
BY Bean, Brooks, Buckley & Bean
ATTORNEYS

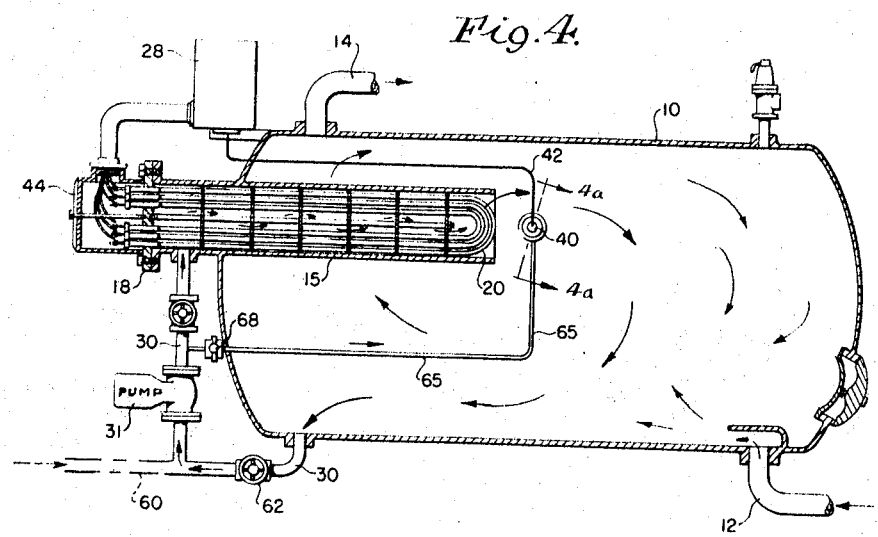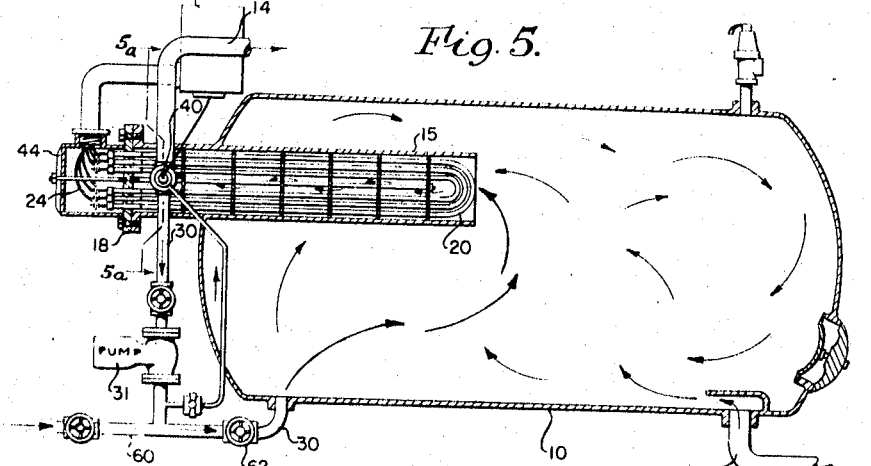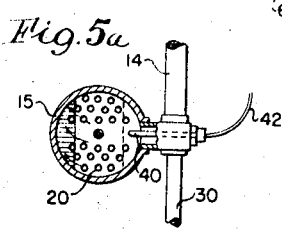

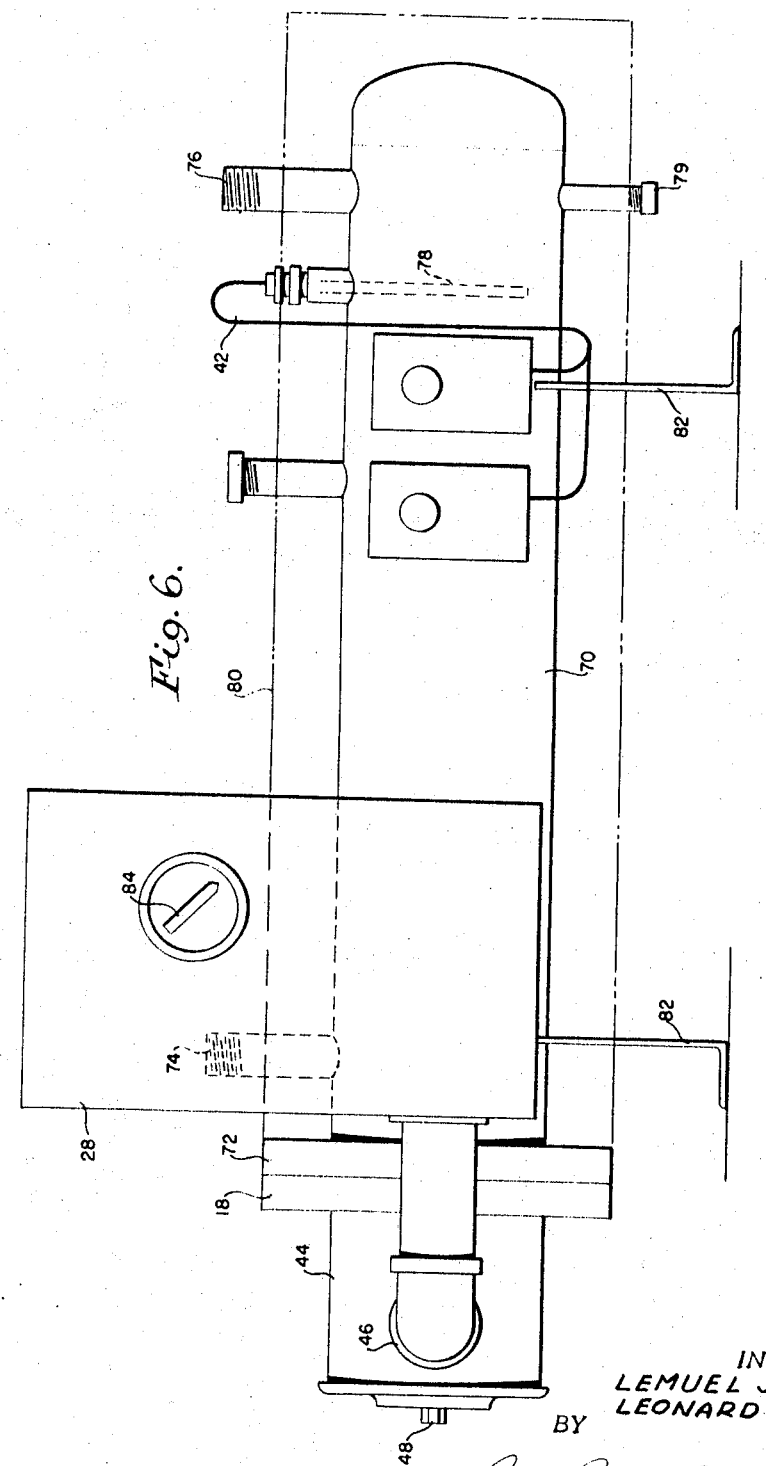

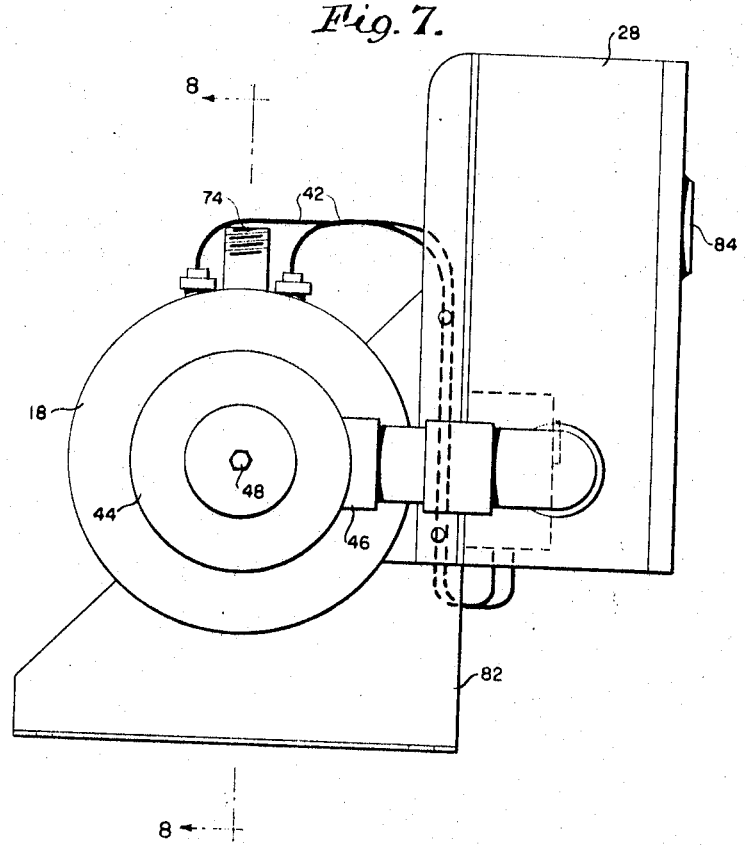

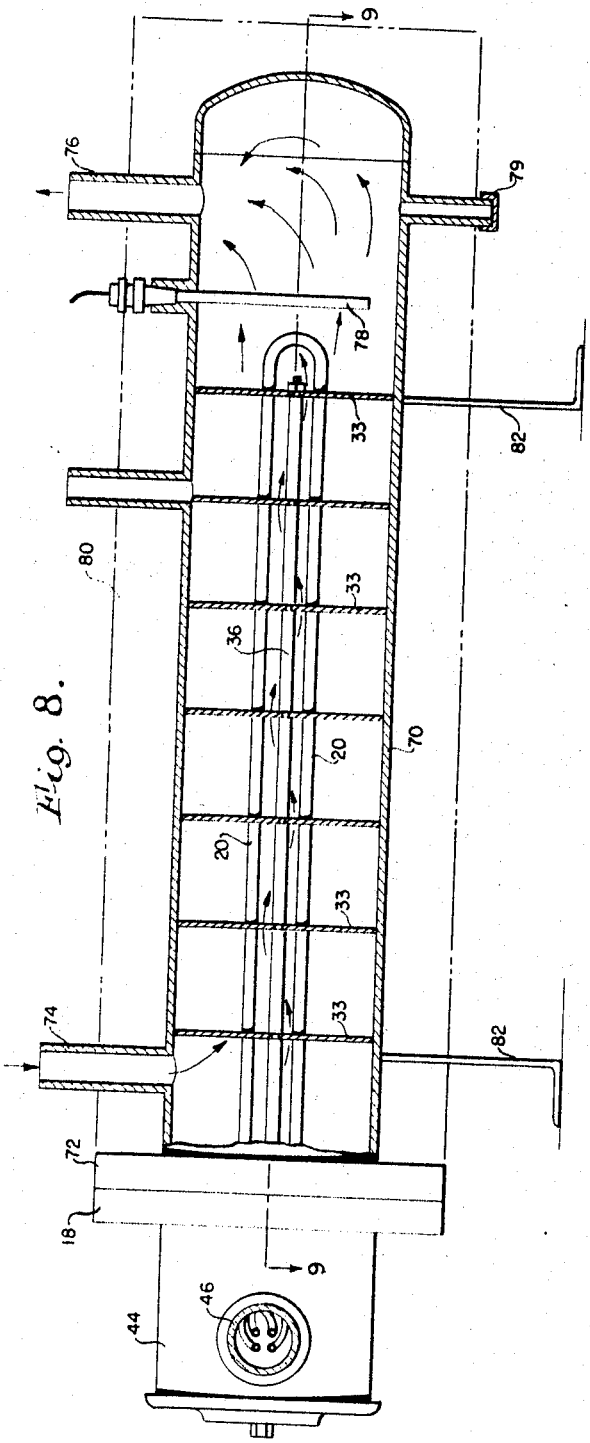
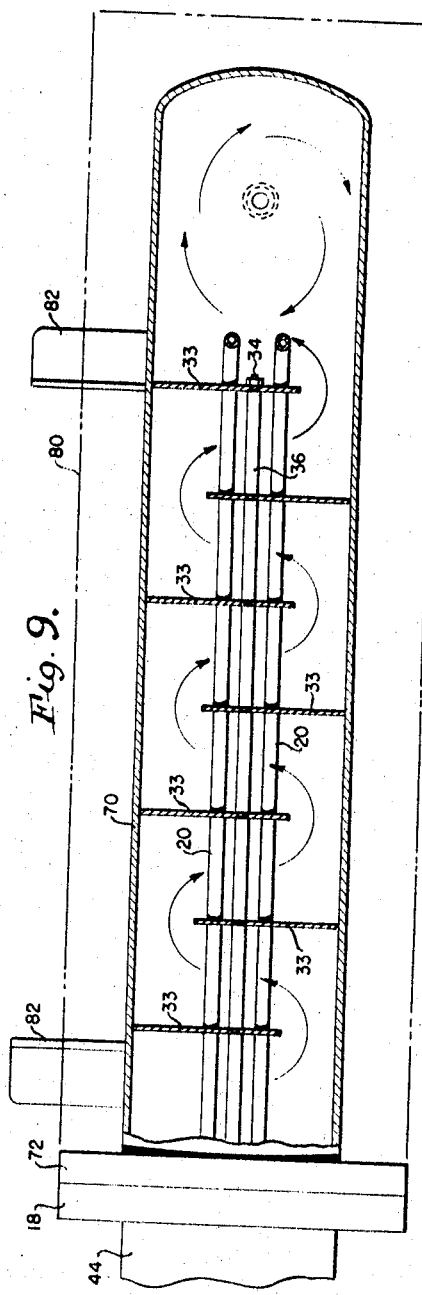

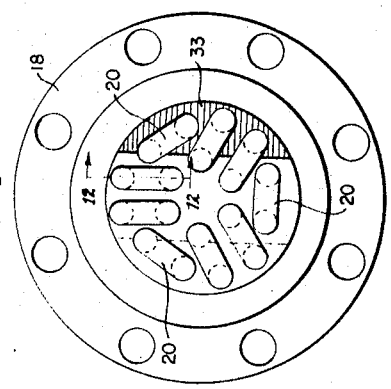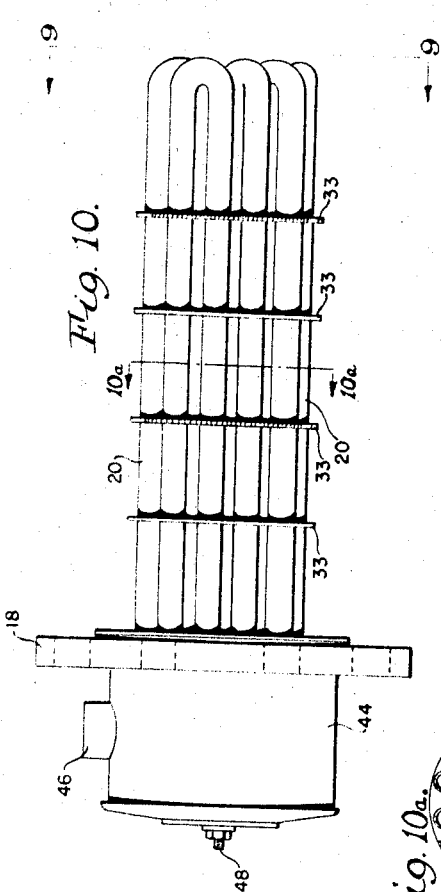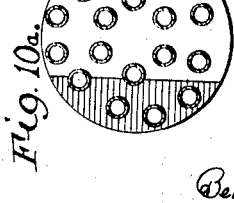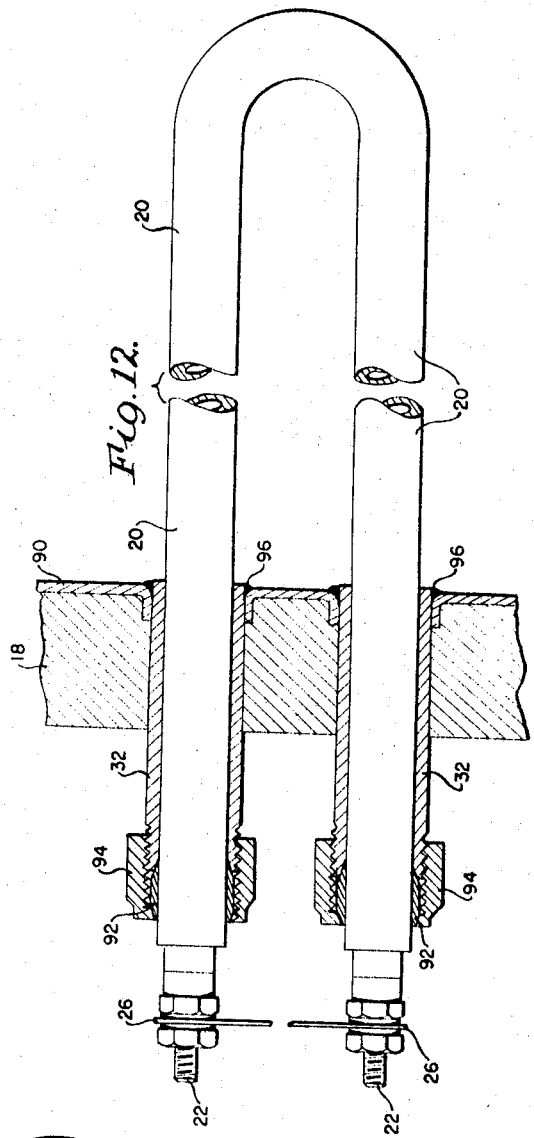

United States Patent Office 3,446,939
Patented May 27, 1969

3,446,939
ELECTRIC IMMERSION WATER HEATER
Lemuel J. Morgan, Stroudsburg, and Leonard F. Lowe, East Stroudsburg, Pa., assignors to The Patterson Kelley Co., Inc., East Stroudsburg, Pa.
Filed Sept. 8, 1966, Ser. No. 577,922
Int. Cl. H05b 3/78
U.S. Cl. 219—316                                7 Claims

ABSTRACT OF THE DISCLOSURE

A liquid heater comprising a structure defining a horizontally elongated liquid passgeway connected in fluid communication at its opposite ends to separate feed liquid inlet and heated liquid outlet devices. A heating element including a header sheet is detachably mounted on and closes one end of the passageway and a plurality of electrical resistance heating blades are mounted upon and extending through the header sheet into the passageway. A plurality of vertically standing baffle plates re arranged in a relatively spaced reltionship lengthwise of the passageway and serve to direct liquid circulating through the passageway to travel in a horizontal zig-zag path in heat exchange relation with the heating blades.

---

This invention relates to water or other liquid heaters, and more particularly to improved electrically powered heating systems of the so-called "instantaneous" and "storage water heater" types, designed specifically for commercial, industrial, institutional, and/or domestic water heating purposes, or the like. Equipment constructed in accordance with the present invention is meeting with outstanding success in response to only recent introduction to the trade.

It is the primary object of the present invention to provide, in an electrically heated system as aforesaid, an improved immersion heating element mounting and fluid-circulating and heat-exchange arrangement; whereby improved heat exchange efficiencies are realized.

More specifically, it is an object of the invention to provide an improved electrical heating element unit as aforesaid, in combination with an improved heat exchanging water circulation velocity control arrangement; whereby heat exchange efficiency is increased and the heating elements are constantly "scrubbed" and "run cooler," whereby scale accumulations or the like on the elements are effectively avoided.

Another specific object of the invention is to provide in a heating system as aforesaid an improved heat exchange fluid flow control and heater element suspension means, providing improved heat-exchange efficiencies and accommodating fluctuating temperature-induced dimensional changes of the heater elements, in improved manner.

Other objects and advantages of the invention will appear from the specification hereinafter and the accompanying drawing wherein:

FIG. 1 is a vertical sectional view through a water heater system; illustrating by way of one example an embodiment of the present invention;

FIG. 2 is a sectional view taken as suggested by line 2—2 of FIG. 1;

FIG. 3 is a fragmentary enlarged scale sectional view taken as indicated by line 3—3 of FIG. 2;

FIGS. 4, 5 correspond to FIG. 1 but illustrate modified forms of heating systems embodying the invention;

FIG. 4a is a fragmentary sectional view taken as suggested by line 4a—4a of FIG. 4;

FIG. 5a is a fragmentary section taken on line 5a—5a of FIG. 5;

FIG. 6 is a side elevational view of still another form of heater device embodying the invention;

FIG. 7 is an end elevational view of the device of FIG. 6;

FIG. 8 is a sectional view of the heater unit taken as suggested by line 8—8 of FIG. 7;

FIG. 9 is a sectional view taken along line 9—9 of FIG. 8;

FIG. 10 is a disassembled side view of a typical heating element unit construction of the invention;

FIG. 10a is a section taken on line 10a—10a of FIG. 10;

FIG. 11 is an end view thereof as suggested by line 11—11 of FIG. 10; and

FIG. 12 is an enlarged scale fragmentary sectional view as suggested by line 12—12 of FIG. 11.

Whereas heat-generating resistance conductors such as are typically employed in immersion-type resistance heating elements will in any case invariably draw upon the power source for a given kilowatt input, they are thereby limited to supply to the substance being heated a correspondingly invariable heat output. However, the present invention provides an improved heating system wherein the substance being heated is caused to circulate at optimum velocities in intimate heat exchange relation with the heating elements, whereby improved (higher) heat exchange rates are attained. Hence, the heat exchange elements per se "run cooler" than in the case of prior art resistance type heaters, thereby preventing or at least minimizing precipitation of mineral solutes from the feed water or the like. This, in combination with the fact that (in the case of the present invention) the tank water is continuously agitated and circulates with a scrubbing action against the heater elements, causes the heating elements to remain free from solids accumulations or deposits such as would otherwise foul their surfaces and reduce the heat exchange efficiency of the system.

By way of example, as shown in the drawing herewith at FIGS. 1-3, the invention may be embodied in a heater device comprising a combination water heating and storage tank 10 having a cold water inlet as indicated at 12 and a hot water outlet connection as indicated at 14. The heat generating device includes a generally tubular-shaped shroud 15 mounted to extend in fluid-sealed relation, as by welding or the like as indicated at 16, through an apertured side wall portion of the tank. The shroud is dimensioned to extend a substantial distance into the tank but terminates at its inner open end portion short of the opposing tank side wall. At its other end the shroud extends exteriorly of the tank and is flanged as indicated at 17 to accommodate in bolted relation thereon a "header sheet" 18 as by means of bolts 19.

The heating element blades are illustrated at 20, and are shown herein to be of return-bent or U-shaped form; it being understood of course that the blades may be of any other preferred shapes or forms, and that in any case each blade comprises a tubular sheath enclosing an electrically conductive high resistance element spaced from and supported relative to the sheath by a filling of electrically insulating and heat-conducting material. At its opposite ends, each resistance conductor is electrically connected to a terminal pin such as indicated at 22, to which electrical supply lead wires 24 are connected as by means of terminals and lock nut devices as indicated at 26 (FIG. 1). The lead wires 24 connect to any suitable supply source preferably via a thermostatically controlled switch-terminal box such as is indicated at 28 (FIG. 1) for heating temperature control as will be explained more fully hereinafter.

The cold water inlet connection 12 includes a branch conduit 30 having a continuously operating pump 31 in connection therewith, whereby the water in the tank (and freshly entering water) is constantly circulated from out of the bottom of the tank into the outer end of the shroud 15 and thence in zag-zag flowing relation through the shroud in rapidly moving heat-exchange relation with the heater blades, and thence through the open inner end of the shroud and into the tank.

Ferrule devices as indicated at 32 (FIGS. 1, 12) may be provided to assist in the mounting of the heater blades 20 in the header sheet 18, but in view of the substantial horizontal extensions of the blades 20 we also provide a combination water flow velocity control and secondary blade support system. This system comprises a series of vertically disposed baffle plates 33 alternately extending from opposite sides of the shroud wall interior but only part-way across (FIGS. 2, 3) and thereby acting to force the circulating water to flow in a horizontally zig-zag path along the heater blades 20 as indicated by the flow directional arrows of FIG. 3. The baffle plates 33 are perforated as shown in FIGS. 2, 3, to accommodate in slip-fitting relation therethrough the heater blades 20 and also a pair of tie rods 34 carrying spacer tubes 36 between the baffles; the tie rods being anchored at their ends in the header plate 18.

Thus it will be understood that whereas the outer end portions of the heater elements are fixedly mounted in the header plate 18, their horizontally extending body portions are vertically supported by means of the baffle plates 33 while being free to expand-contract longitudinally as viewed in FIG. 1 in response to fluctuating temperature induced length-changes of the blades 20, without introduction of any undesirable stresses on the blades or on the support system.

The current supply regulator unit 28 may be arranged to be controlled by a temperature sensing "bulb" or the like such as is shown at 40, which is preferably located in the hot water withdrawal area of the tank (FIG. 1); the control line from the sensor to the electrical power control system being indicated at 42. It will be noted that the hot water takeoff conduit 14 draws from the storage area of the tank and from the inner open end of the shroud 15, and that the operation of the pump 31 (when the hot water outlet is closed) constantly circulates water through the heating blade bundle, and delivers it as indicated by the flow directional arrows of FIG. 1 in the form of a widely dispersing pattern of heated water throughout the interior of the tank. Thus, a superior admixture of raw water and heated water at the time of raw water inlet is attained; and an optimum uniformity of heated water temperatures throughout the various levels of the storage tank is maintained during "idle" periods.

As shown in FIG. 1 the terminal ends of the blades 20 and their electrical connections with the lead wires 24 are preferably enclosed within a detachable cover 44 which includes a sidewall inlet portal 46 which is internally threaded to accommodate a bushing 47 through which the connecting lead wires 24 extend. A stay-bolt 48 is provided to detachably lock the cover 44 in operative position as shown in FIG. 1; the stay-bolt being arranged to screw-thread engage a bored and tapped portion of the header plate 18.

FIG. 4 illustrates another form of the heating system of the invention wherein the storage tank 10 is of horizontally elongate form and wherein the heater shroud 15 is disposed in the upper portion of the tank in the region of the hot water draw-off conduit 14. An alternative water inlet may also be provided as indicated at 60 for connection to the heated water utility system and into the pump circulating conduit 30. A control valve as indicated at 62 may be provided in the conduit 30 leading from the tank 10 to enable the operator to optionally control inflow of raw water and/or recirculation of heated water from the utility system; and a one-way check valve (not shown) may be employed in the line 60 if desired, to limit withdrawal of heated water from the system to the outlet 14. Also, as shown in FIGS. 4, 4a, a bypass conduit 65 is provided to conduct raw "cold" water directly into a shroud 66 surrounding the sensing bulb 40 whenever a heavy withdrawal load is suddenly applied to the system, whereby the sensor will instantaneously signal to the voltage control system at the controller 28 that more power is immediately needed to keep up with the demand. A conduit-pressure-responsive flow control valve as indicated at 68 is provided in the line of the conduit 65 to permit of manual adjustments to attain the preferred mode of operational response of the bypass control system to varying load demands.

FIGS. 5, 5a illustrate a heater system generally similar to that of FIG. 4 except that the direction of water circulation through the pump and tank and heating element is reversed, and in the case of FIG. 5 the water temperature sensor 40 is disposed in the heated water withdrawal conduit 14, as best shown in FIG. 5a. Thus in this case also, upon sudden withdrawals of heated water through conduit 14, relatively cold water will be drawn into the shroud surrounding the sensing bulb 40, whereby the latter will immediately signal to the controller 28 that more power is needed to compensate for the heated water withdrawal and to maintain the output water within the prescribed temperature range.

FIGS. 6, 7, 8, 9 illustrate an "instantaneous" type water heater mechanism of the present invention, such as is particularly adapted for use for example in connection with the heating of the contents of a swimming pool, or the like. The heater shell is indicated at 70 and includes a flanged open end portion 72 which mounts the heater header 18 embodying the improved heating element and water flow heat-exchange rate control mechanism of the present invention which are further illustrated for example at FIGS. 7–12, inclusive. In this example of the invention the heating elements 20 are generally of the type shown and described in connection with the illustration at FIGS. 1–3. The cold water inlet is indicated at 74 and the heated water outlet is indicated at 76. The water temperature sensing bulb is indicated at 78 and a sediment drain-off is indicated at 79. As indicated at 80, the shell 70 may be enclosed within a heat-insulating casing, and the entire structure mounted upon pedestals 82—82 whereby the device may be easily skidded from place to place as intended usage may dictate. As shown at FIG. 6, the electrical control panel 28 may be provided with a manually adjustable regulator as indicated at 84, for variable control of the temperature of the output water. As indicated hereinabove, the water circulating system will include at some point a constant circulation means such as a pump which will insure forced circulation of the water through the heating shroud and around the heating elements as explained hereinabove.

FIG. 12 illustrates in detail a preferred mode of construction of the header sheet 18 and of the method of mounting the heater blades 20 thereon. The header plate 18 is preferably provided with enlarged bores therethrough whereby to accommodate nonferrous bushings 32 therethrough which in turn accommodate in slide-fitting relation the terminal ends of the blades 20. The interior surface of the header plate 18 is preferably lined with a nonferrous sheet or plate as indicated at 90, and the external surfaces of the heating blades 20 are also preferably coated with a nonferrous material such as copper or the like. Hence, rust contaminations of the water and/or deteriorations of the heater parts are avoided. As indicated at 92, a resilient packing enclosed within a packing nut 94 is preferably provided to encircle the outer end portion of each bushing member 32, whereby to liquid-pressure seal the exit of each heater blade through the header unit. To effectively seal the inner ends of the bushings 32 to the header liner plate 90, the parts may be brazed or soldered together as indicated at 96 (FIG. 12).

It is a particular feature and advantage of the present invention that the fluid flow control baffle arrangement within the heater shroud provides a tortuously extending and constricted passageway for the liquid being forced through the shroud 15 by the pump 31. Hence, the liquid travels through the heater unit in the form of a turbulent stream moving at a controlled and improved velocity in a three-dimensionally directed travel path and in heat-exchange contact with the heater blades 20, throughout the entire lengths thereof. Thus the heat exchange rate relative to each blade surface is markedly improved, and an optimum overall heat exchange efficiency is attained. At the same time the heater blade surfaces are constantly "scoured" and caused to "run cool," thereby minimizing the possibility of precipitation thereon of solids from the heated water and consequent fouling of the heat-exchange surfaces.

As shown herein the baffle plates 33 may extend vertically throughout the entire vertical height of the shroud 15 but in each case only part-way across the interior of the shroud (alternately from opposite sides thereof). By virtue of this arrangement any precipitates or other solids entrained in the feed water are simply swept through the heat exchange unit in the horizontally zig-zag path hereinabove referred to, and encounter no "floor pockets" or "hurdle barriers" or the like, such as would operate to entrap them and result in "hot spot" deposits or scaling or the like. Hence it will be appreciated that the heater of the invention will operate at an optimum degree of efficiency and will continue to do so without cleanout maintenance attention or the like such as is required to keep conventional heaters reasonably operative.

It will of course be understood that whereas only a few forms of the invention have been illustrated and described in detail herein, various changes may be made therein without departing from the spirit of the invention and/or the scope of the following claims.

What is claimed is:

1. A liquid heater comprising, in combination, a liquid container including a structure defining a horizontally elongate liquid passageway portion in communication with an open liquid storage chamber portion, a series of baffle devices disposed in relatively spaced relation longitudinally within said passageway portion, a heating element disposed within said passageway portion and positionally supported therein by said baffle devices, separate feed liquid inlet and heated liquid outlet devices connected in communication with the interior of said container, means inducing forced circulation of liquid through said passageway at a surface-scrubbing velocity, said baffle devices comprising generally vertically standing plates partially opposing flow of liquid through said passageway and alternately extending from opposite wall portions of said passageway structure but only partly horizontally crosswise of the interior thereof, thereby directing liquid moving through said passageway to travel in a horizontal zig-zag path in heat-exchange scrubbing relation with said heating element while constantly sweeping the surfaces of said passageway structure.

2. A liquid heater as set forth in claim 1 wherein said baffle plates are held in operative position by means of interconnecting tie rod devices.

3. In a liquid heater comprising, in combination, a liquid container including a horizontally elongated shroud defining an elongated liquid passageway portion, said shroud being generally closed at one end and being open at its other end in free communication with the interior of said container, a series of baffle devices disposed in relatively spaced relation longitudinally within said passageway portion; heating means including a header sheet detachably mounted upon and closing said one end of said shroud, a plurality of electrical resistance heating blades having cylindrically shaped terminal end portions space-fitted through threaded bushings extending externally from said header sheet, and pack nuts encircling said terminal end portions and screw-threaded upon said bushings to detachably mount said blades relative to said header sheet in a fluid-pressure sealing realtion, said blades being disposed within said passageway portion and positionally supported therein by said baffle devices; separate feed liquid inlet and heated liquid outlet connection devices, one of said connection devices being connected in communication with the interior of said container, the other of said connection devices being connected in communication with said closed end of said shroud; and means inducing force circulation of liquid through said passageway at a surface-scrubbing velocity, said baffle devices comprising generally vertically standing plates partially opposing flow of liquid through said passageway and alternately extending from opposite wall portions of said passageway structure but only partly cross-wise of the interior thereof, thereby directing liquid moving through said passageway to travel in a zig-zag path in heat-exchange scrubbing relation with said heating blades while constantly sweeping the surfaces of said passageway structure.

4. A liquid heater comprising, in combination, a structure defining an elongated liquid passageway portion; heating means including a header sheet detachably mounted on and closing one end of said passageway portion and a heating element including a plurality of electrical resistance heating blades detachably mounted on and extending through said header sheet into said passageway portion; a plurality of baffle devices, said heating blades being slip fit through said baffle devices; liquid inlet and heated liquid outlet devices connected in communication with opposite ends of said passageway portion; means adapted to induce forced circulation of liquid through said passageway portion between said liquid devices, said baffle devices directing liquid circulating through said passageway to travel in a zig-zag path in heat-exchange relationship with said heating blades; and interconnecting tie rod devices adapted to maintain said baffle devices in a relatively spaced relationship longitudinally within said passageway portion and adapted to interconnect said baffle devices to said header sheet, whereby upon removal of said header sheet from said one end of said passageway portion said baffle devices and said heating blades may be simultaneously removed from said passageway portion and upon disconnecting said heating blades from said header sheet said heating blades may be removed from said baffle devices.

5. A liquid heater comprising, in combination, a structure defining a horizontally elongated liquid passageway portion; heating element including a header sheet detachably mounted upon and closing one end of said passageway portion and a plurality of electrical resistance heating blades mounted upon and extending through said header sheet into said passageway portion; a plurality of baffle devices disposed in relatively spaced relation longitudinally within said passageway portion, said heating blades being positionally supported within said passageway portion by said baffle devices; separate feed liquid inlet and heated liquid outlet devices connected in communication with opposite ends of said passageway portion; and means adapted to induce forced circulation of liquid through said passageway portion between said liquid devices, said baffle devices comprising generally vertically standing plates partially opposing flow of liquid through said passageway and alternately extending from opposite wall portions of said passageway structure but only partially horizontally crosswise of the interior thereof, thereby directing liquid circulating through said passageway portion to travel in a horizontal zig-zag path in heat-exchange relation with said heating blades while continuously sweeping surfaces of said passageway structure.

6. A liquid heater according to claim 5, wherein interconnecting tie rod devices are provided to maintain said baffle plates in a relatively spaced relationship longitudinally within said passageway portion and adapted to interconnect said baffle plates to said header sheet, and said heating blades are slip fit through said baffle plates.

7. A liquid heater according to claim 5, wherein said liquid inlet device is disposed adjacent said one end of said passageway and said heating liquid outlet device is disposed adjacent another end of said passageway, said heating liquid outlet device defining a heated liquid outlet opening in an upper wall portion of said passageway structure intermediate said opposed wall portions, whereby liquid is removed from said passageway along a vertical path of travel arranged substantially normal to said horizontal zig-zag path.

References Cited

UNITED STATES PATENTS

| 2,879,749 | 3/1959 | Lewy | 122—32 |
| 3,276,517 | 10/1966 | Lowe | 165—108 X |
| 3,315,735 | 4/1967 | Stranko | 122—32 X |
| 3,330,332 | 7/1967 | Warner | 122—32 X |
| 3,339,531 | 9/1967 | Fitzgerald | 122—32 |

ANTHONY BARTIS, *Primary Examiner.*

C. L. ALBRITTON, *Assistant Examiner.*

U.S. Cl. X.R.

122—32; 165—108; 219—306, 312, 314